(12) United States Patent
MacMillian et al.

(10) Patent No.: US 8,725,365 B2
(45) Date of Patent: May 13, 2014

(54) METHOD FOR CONTROLLING AN AUTOMATED CLUTCH OR AUTOMATED TRANSMISSION OR A DRIVE UNIT IN A VEHICLE

(71) Applicant: Schaeffler Technologies AG & Co. KG, Herzogenaurach (DE)

(72) Inventors: Loyal George MacMillian, Karlsruhe (DE); Bradley Shellhammer, Chippewa Lake, OH (US); Daniel Redel, Buehl (DE); Gerald Kuestler, Gaggenau (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/888,507

(22) Filed: May 7, 2013

(65) Prior Publication Data

US 2013/0253784 A1 Sep. 26, 2013

Related U.S. Application Data

(63) Continuation of application No. PCT/DE2011/001932, filed on Nov. 4, 2011.

(30) Foreign Application Priority Data

Nov. 11, 2010 (DE) .......... 10 2010 051 149

(51) Int. Cl.
*G06F 7/00* (2006.01)
*F16H 61/02* (2006.01)
*B60W 10/06* (2006.01)
*F16H 59/62* (2006.01)
*F16H 59/72* (2006.01)
*F02D 29/02* (2006.01)

(52) U.S. Cl.
CPC ............ F16H 61/0213 (2013.01); *B60W 10/06* (2013.01); *F16H 59/62* (2013.01); *F16H 59/72* (2013.01); *F02D 29/02* (2013.01)
USPC .................. 701/51; 701/53; 701/67; 701/103

(58) Field of Classification Search
CPC ..... F16H 61/0213; F16H 59/62; F16H 59/72; B60W 10/06
USPC ............. 701/51, 53, 54, 61, 67, 103; 123/478
See application file for complete search history.

(56) References Cited

U.S. PATENT DOCUMENTS 4,364,357 A * 12/1982 Matsuoka ...................... 123/699
4,771,753 A * 9/1988 Ohishi ........................... 123/674
4,926,821 A * 5/1990 Porth et al. ..................... 123/399

FOREIGN PATENT DOCUMENTS

DE 102005029566 2/2006
DE 102005061080 7/2006

* cited by examiner

*Primary Examiner* — Gertrude Arthur Jeanglaude
(74) *Attorney, Agent, or Firm* — Simpson & Simpson, PLLC

(57) ABSTRACT

A method for controlling an automated clutch or an automated transmission or a drive unit in a vehicle is disclosed in which protective measures for the clutch and/or for the transmission and/or for a drive unit is provided by the control system. The protective measures include measures against overheating or wear. When measuring temperature, allowance is made for the air density in the vehicle environment or altitude as compared to sea level.

9 Claims, 1 Drawing Sheet

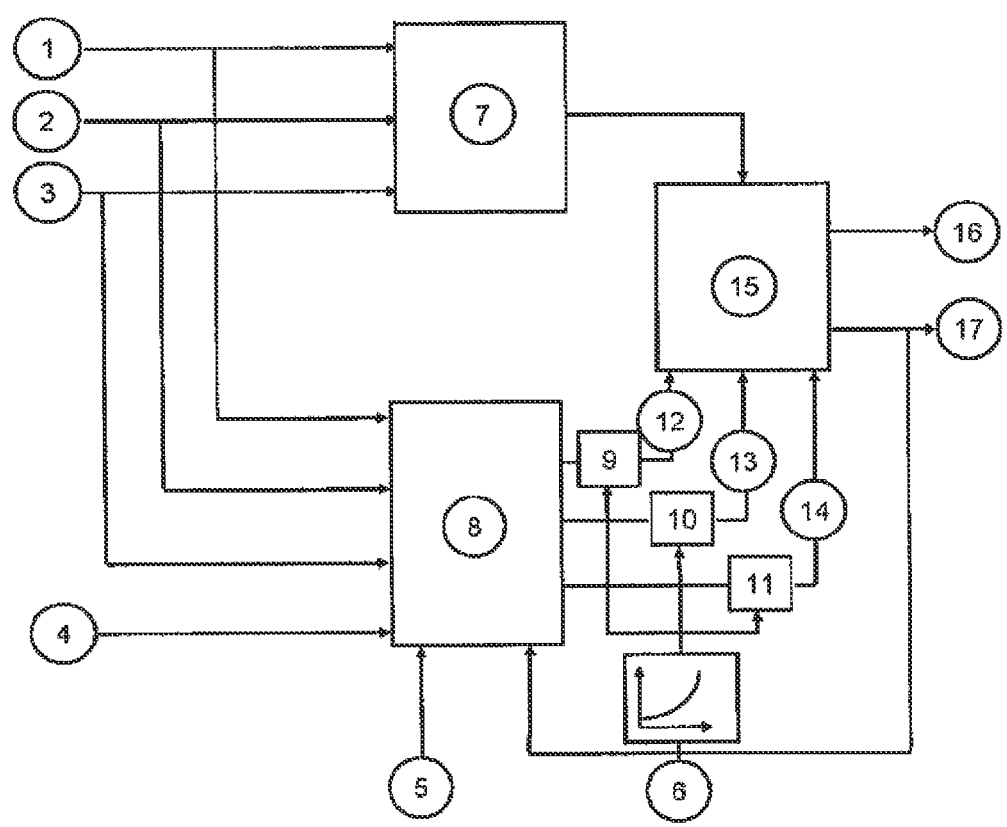

METHOD FOR CONTROLLING AN AUTOMATED CLUTCH OR AUTOMATED TRANSMISSION OR A DRIVE UNIT IN A VEHICLE

CROSS-REFERENCE TO RELATED APPLICATIONS

This application is filed under 35 U.S.C. §120 and §365(c) as a continuation of International Patent Application No. PCT/DE2011/001932, filed Nov. 4, 2011, which application claims priority from German Patent Application No. DE10 2010 051 149.8, filed Nov. 11, 2010, which applications are incorporated herein by reference in their entirety.

FIELD OF THE INVENTION

The invention relates to a method for controlling an automated clutch or an automated transmission or a drive unit in a vehicle, where protective measures for the clutch and/or for the transmission and/or for a drive unit are provided by the control system.

BACKGROUND OF THE INVENTION

The field of application and intended use of the invention lies in controlling an automated clutch, including, for example, a dual clutch, as well as a transmission, wherein, depending on a modeled temperature—which may also be found by calculation on the basis of a model of the clutch, for example—protective strategies are activated, which for example counteract warming or excessive wear. Relevant temperature models are, in particular, clutch temperature models, but also transmission temperature models.

Temperature models such as are disclosed, for example, in DE 10 2005 061 080 A1 or DE 10 2005 029 566 A1 are not dependent on the driving altitude above mean sea level or above standard elevation zero (the German standard for sea level). Temperature models for the clutch are known which take into account the interaction of friction and cooling capacity, as are temperature models for the transmission, in particular for the transmission fluid, which take into account the interaction of transmission efficiency and transmission cooling. Cooling is usually modeled empirically as a function of a variable that indicates the strength of the cooling air stream, for example as a function of vehicle velocity or of a speed of rotation.

The protective strategies are not effective in a timely manner at altitude, which can damage or even destroy the hardware. Alternatively, the protective strategies are developed for the "worst case" scenario; that is, as a result however at a low altitude the driving function is restricted disproportionately early by protective strategies, which the driver notices as a product deficiency in terms of performance, availability, unnecessary warnings or service alerts.

It has been recognized that altitude has a noticeable influence of up to 30 percent on cooling properties, because of the air density. The cooling of the clutch or transmission occurs by convection, i.e., by the "evacuation" of warmed air at the heated location to a cooler location, or completely out of the vehicle. One of the factors relevant for this is the air density, since it describes the "absorption capacity" for heat by the air. A lower air density results in a lower air volume or air mass flow, so that less heat can be removed by convection.

BRIEF SUMMARY OF THE INVENTION

The present invention is based on the object of improving the temperature models, and hence the protective strategies, in reference to the influence of altitude on cooling.

According to the invention, a method is provided for controlling an automated clutch or an automated transmission or a drive unit in a vehicle, wherein protective measures are provided by means of the control system for the clutch and/or for the transmission and/or for a drive unit, with regard to overheating or wear, which are undertaken depending on an obtained temperature of a specified vehicle component of the clutch or transmission or drive unit, whose cooling takes place by convection. According to the provisions of the invention, when obtaining the temperature, allowance is made for the air density in the vehicle environment and/or the driving altitude relative to standard elevation zero (sea level) and/or the air mass flow around the vehicle component contributing to cooling.

A preferred embodiment of the invention includes the provision that the obtained temperature of the specified vehicle component is determined depending on the cooling capacity.

Another preferred embodiment of the invention provides that the absolute air pressure is obtained by means of a pressure sensor, and from it the altitude, or that the static pressure at the vehicle is obtained with the aid of a pressure sensor, and from it the altitude, or that the altitude is obtained by means of a GPS device, or that the altitude is obtained by means of a pressure measurement obtained in an air intake during a determination of air mass.

Another preferred embodiment of the invention provides that the air volume flow around the vehicle component that contributes to the cooling, or the air density, is obtained by means of an air volume sensor or air mass sensor or air mass flow sensor, or that the air mass flow around the vehicle component that contributes to the cooling, or the air density, is obtained by means of a pressure obtained in an air intake during a determination of air mass.

Another preferred exemplary embodiment of the invention provides that the obtained pressure is a suction pipe pressure.

Another preferred embodiment of the invention provides that the cooling capacity is determined by means of a stored altitude-dependent or air-density-dependent or air-mass-flow-dependent characteristic diagram.

Another preferred embodiment of the invention provides that parameters which are included when determining the cooling capacity independent of the altitude—i.e., the parameters are designed, for example, for standard elevation zero (sea level)—are adjusted by means of the stored altitude-dependent characteristic diagram, or that parameters which are included in determining the cooling capacity independent of the air density are adjusted by means of the stored air-density-dependent characteristic diagram, or that parameters which are included in determining the cooling capacity independent of air mass flow are adjusted by means of the stored air-mass-flow-dependent characteristic diagram.

Another preferred embodiment of the invention provides that a vehicle component is the clutch and/or a component of the clutch, and/or the transmission and/or a component of the transmission, and/or the drive unit and/or a component of the drive unit.

The invention also proposes a device for controlling an automated clutch or an automated transmission or a drive unit in a vehicle that has the clutch, the transmission, the drive unit and at least one control device. The control device is intended for controlling protective measures for the clutch and/or for the transmission and/or for a drive unit, which are undertaken depending on an obtained temperature of a specified vehicle component of the clutch or transmission or drive unit, whose cooling takes place by convection. According to the provisions of the invention, when obtaining the temperature, allowance is made for the air density in the vehicle environment and/or the driving altitude relative to standard elevation zero (sea level) and/or the air mass flow around the vehicle component contributing to cooling.

The method according to the invention results advantageously in an improvement of the temperature model under the influence of altitude, and thus prevents the protective strategies from being implemented too early or too late or not at all.

Additional advantages and advantageous configurations of the invention are the object of the following FIGURE and of the description that follows.

BRIEF DESCRIPTION OF THE DRAWING

FIG. 1 is a schematic depiction of a device for carrying out the method of the invention.

DETAILED DESCRIPTION OF THE INVENTION

It is proposed that allowance be made in the temperature model for a signal that indicates altitude above sea level at which the vehicle is located, in order to thereby reduce the heat transport coefficients of a vehicle component or the cooling capacity attributed in the model to a vehicle component depending on the altitude, if the cooling capacity—as realized in conventional temperature models—already exists as an altitude-independent value for a low altitude such as sea level. Such signals may be for example: an absolute pressure, an altitude signal derived from an air mass or air mass flow sensor which is likewise dependent on the air density, an altitude signal generated from GPS information, a switch signal from an operator. In principle, the model can also be optimized directly with the signal of the static pressure, in which case such a sensor may be accommodated anywhere in or on the vehicle. It is equally possible to determine the pressure signal from the determination of air mass from the air intake, for example the suction pipe pressure.

FIG. 1 shows a device for carrying out the method, as well as a modification of an existing software model, where the modification adds information about the altitude. A new calculation method is used which, compared to previously customary calculation methods, uses in addition an input signal with altitude information.

A temperature model for vehicle components whose cooling occurs by convection and thus is dependent on the altitude above sea level, which takes into account the altitude of the vehicle above sea level, is able to fulfill the stated object. By means of a stored characteristic diagram, the dependence of parameters of the temperature model obtained at lower altitude on the density of the air in the vehicle environment, the viscosity, etc., can thus be mathematically reconstructed, i.e., modeled, by multiplying the parameters by the corresponding characteristic diagram entry. This improves the temperature model under the influence of altitude, and prevents the protective strategies from being implemented too early, too late or not at all.

Reference Labels

1 engine torque
2 engine speed
3 input shaft speed
4 travel velocity
5 peripheral temperatures
6 altitude information
7 calculation of friction
8 calculation of cooling capacity
9 plus factor for heat transfer (specifically convection) depending on altitude
10 plus factor for heat transfer (specifically convection) depending on altitude
11 plus factor for heat transfer (specifically convection) depending on altitude
12 cooling capacities of the individual cast masses
13 cooling capacities of the individual cast masses
14 model for calculating temperature and wear
15 simulated wear of the clutch plates
16 simulated temperatures of cast masses and of the air surrounding the clutch

What is claimed is:

1. A method for controlling an automated clutch or automated transmission or drive unit in a motor vehicle, where protective measures are provided by a control system for the clutch and/or for the transmission and/or for a drive unit which are undertaken depending on an obtained temperature of a specified vehicle component of the clutch or of the transmission or of the drive unit, whose cooling occurs by convection, characterized in that an air density in the environment of the vehicle and/or an altitude relative to standard elevation zero (sea level) at which the vehicle is moving and or an air mass flow around the vehicle component contributing to the cooling are taken into account when obtaining the temperature.

2. The method recited in claim 1, wherein the obtained temperature of the specified vehicle component is determined depending on a cooling capacity.

3. The method recited in claim 1, wherein an absolute air pressure is obtained by means of a pressure sensor, and from it the altitude, or that the static pressure at the vehicle is obtained with the aid of a pressure sensor, and from it the altitude, or that the altitude is obtained by means of a GPS device, or that the altitude is obtained by means of a pressure obtained in an air intake during a determination of air mass.

4. The method recited in claim 3, wherein an air volume flow around the vehicle component that contributes to the cooling, or the air density, is obtained by means of an air volume sensor or air mass sensor or air mass flow sensor, or that the air mass flow around the vehicle component that contributes to the cooling, or the air density, is obtained by means of a pressure obtained in an air intake during a determination of air mass.

5. The method recited in claim 3, wherein the obtained pressure is a suction line pressure.

6. The method recited in claim 1, wherein the cooling capacity is determined by means of a stored altitude-dependent or air-density-dependent or air-mass-flow-dependent characteristic diagram.

7. The method recited in claim 6, wherein a plurality of parameters which are included in determining the cooling capacity independent on altitude (i.e., which are designed for standard elevation zero (sea level), i.e., which are not dependent on altitude) are adjusted by means of the stored altitude-dependent characteristic diagram, or that parameters which are included in determining the cooling capacity independent of the air density are adjusted by means of the stored air-density-dependent characteristic diagram, or that parameters which are included in determining the cooling capacity independent of air mass flow are adjusted by means of the stored air-mass-flow-dependent characteristic diagram.

8. The method recited in claim 1, wherein a vehicle component is the clutch and/or a component of the clutch, and/or the transmission and/or a component of the transmission, and/or the drive unit and/or a component of the drive unit.

9. A device for controlling an automated clutch or automated transmission or drive unit in a vehicle which has the clutch, the transmission, the drive unit and at least one control device, where the control device is provided to control protective measures for the clutch and/or the transmission and/or for a drive unit, which are undertaken depending on an obtained temperature of a specified vehicle component of the clutch or of the transmission or of the drive unit, whose cooling occurs by convection, wherein an air density in the environment of the vehicle and/or an altitude relative to standard elevation zero (sea level) at which the vehicle is moving and or an air mass flow around the vehicle component contributing to the cooling is taken into account when obtaining the temperature.

* * * * *